Dec. 5, 1950  
H. G. TRAVER  
2,532,683  
HELICOPTER HAVING ADJUSTABLE ROTORS AND STABILIZING FINS  
Filed Nov. 15, 1943  
5 Sheets-Sheet 1

INVENTOR.  
H. G. Traver  
BY  
John O. Seifert  
ATTORNEY

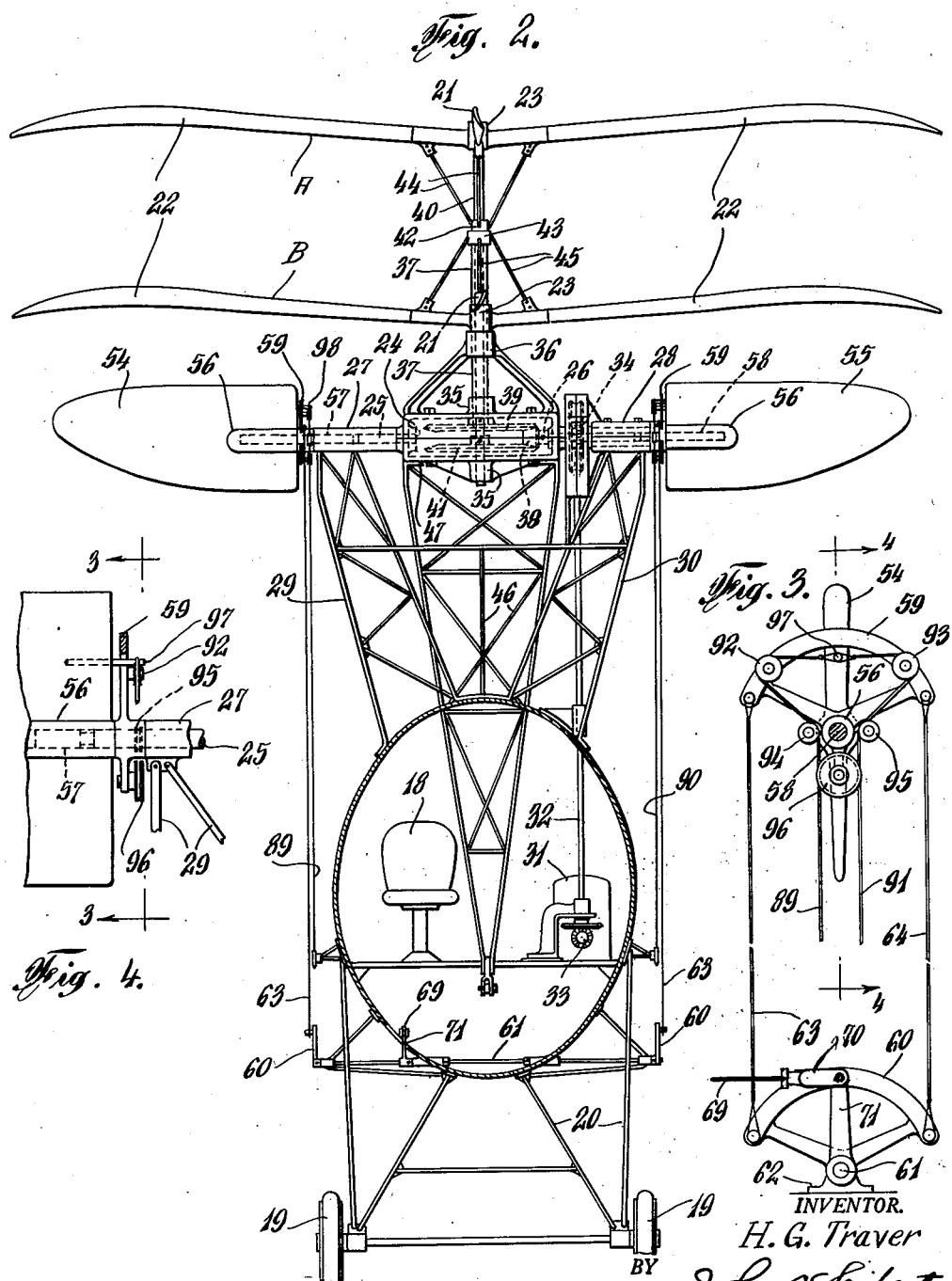

Dec. 5, 1950 H. G. TRAVER 2,532,683
HELICOPTER HAVING ADJUSTABLE ROTORS
AND STABILIZING FINS
Filed Nov. 15, 1943 5 Sheets-Sheet 3
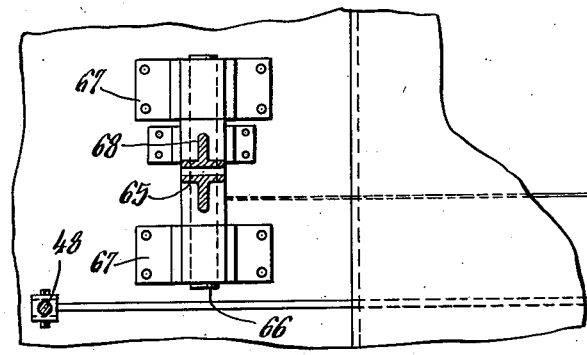
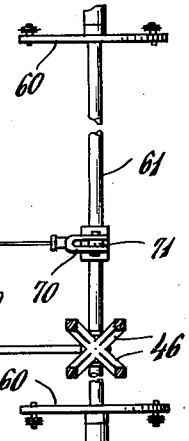
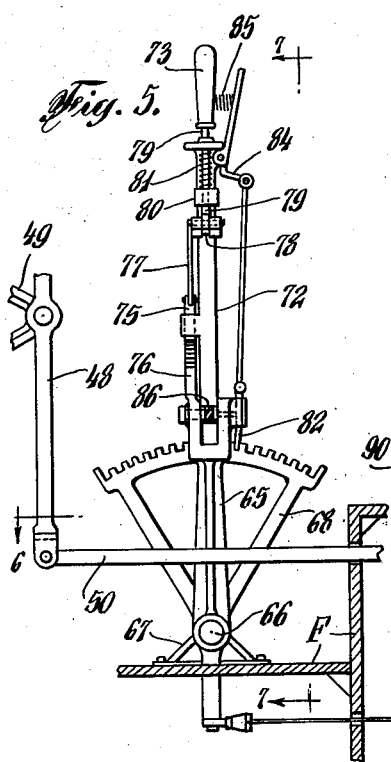
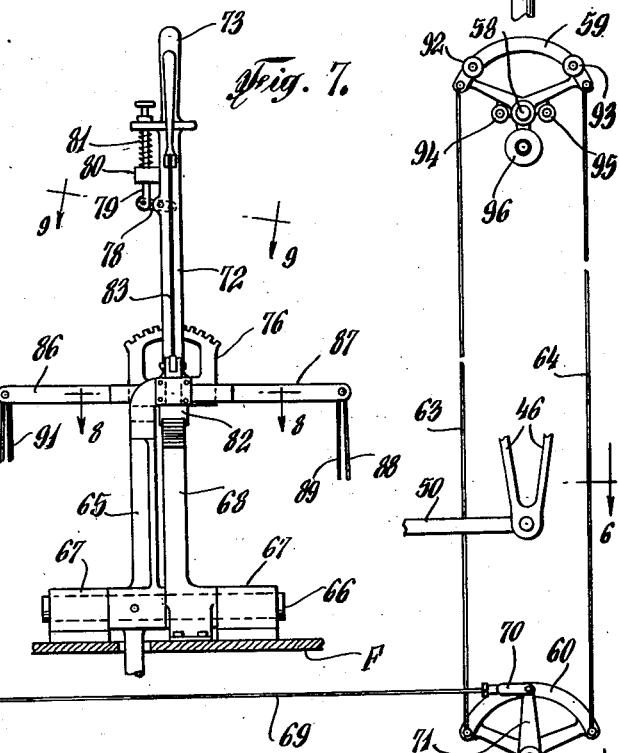
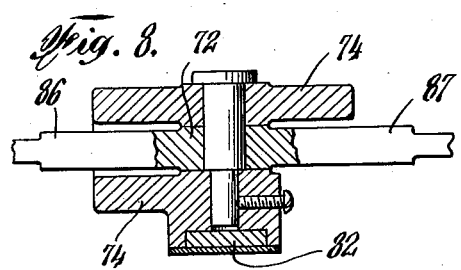
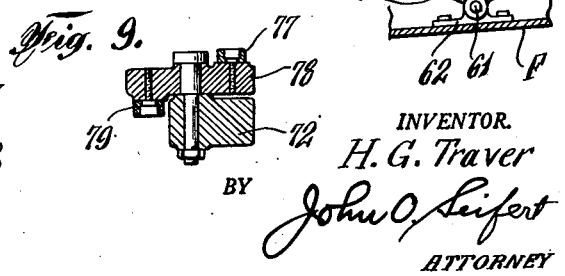
INVENTOR.
H. G. Traver
BY
John O. Seifert
ATTORNEY

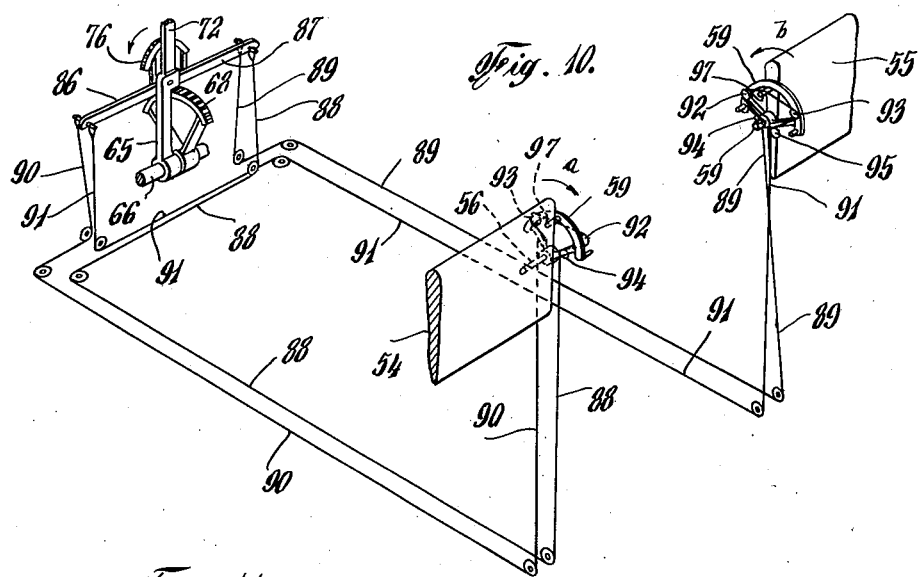
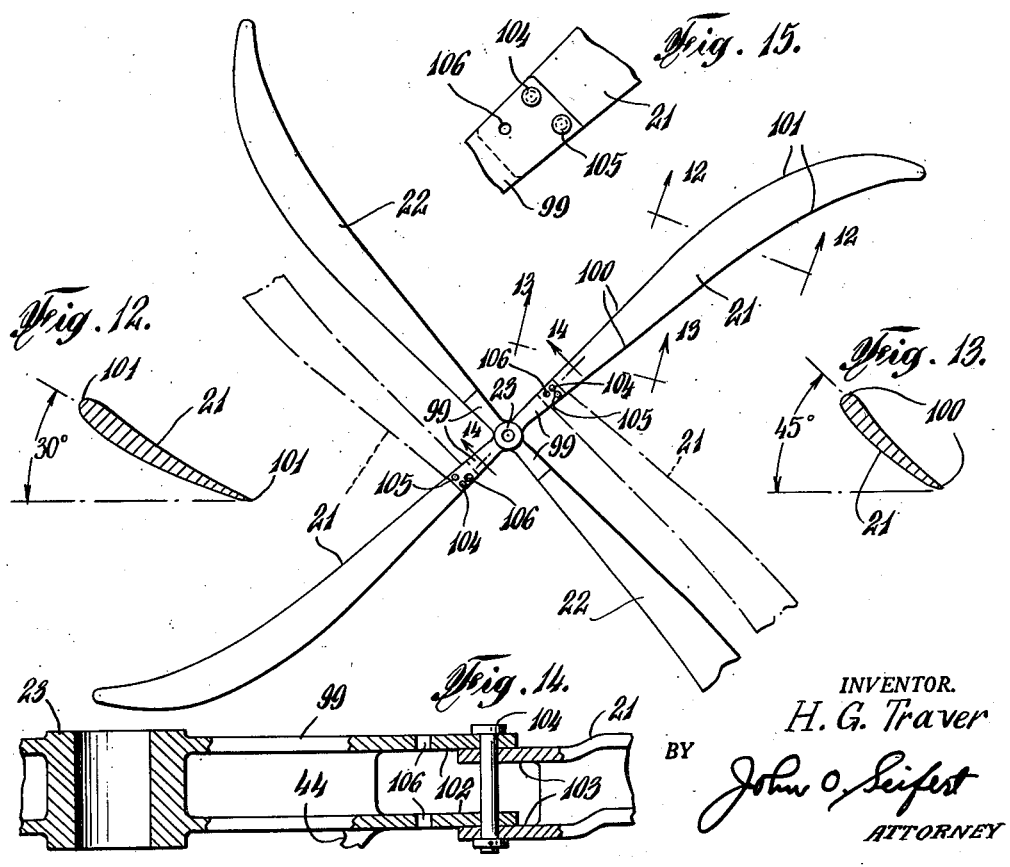

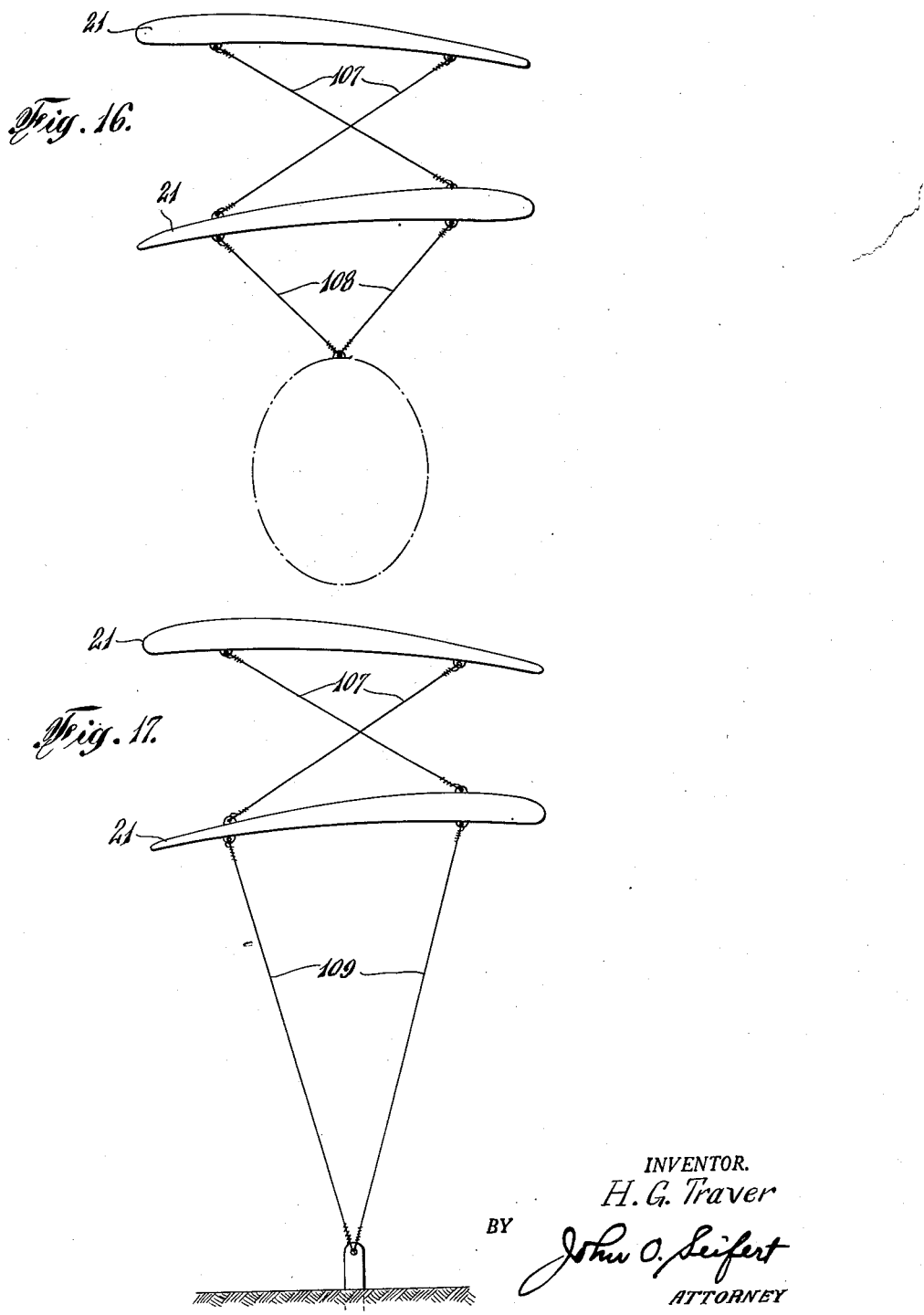

Patented Dec. 5, 1950

2,532,683

UNITED STATES PATENT OFFICE 2,532,683

HELICOPTER HAVING ADJUSTABLE ROTORS AND STABILIZING FINS

Harry G. Traver, Cranford, N. J.

Application November 15, 1943, Serial No. 510,261

8 Claims. (Cl. 244—17.23)

This invention relates to aircraft particularly of the helicopter type including a fuselage carrying power means and arranged with horizontal stabilizing means, a rudder to control the direction of flight and means to connect the fuselage to and adapted to suspend the fuselage from lifting and propelling rotor means.

It is an object of the invention to provide in aircraft of this type improved means to rotatably support the rotor means and pivotally connect said rotor supporting means to the fuselage to support the rotor means to rotate on a vertical axis coincident with the center of gravity of the helicopter and have adjustment on a horizontal axis extending in line with the transverse axis of the fuselage, together with means to adjust the rotor supporting means about its horizontal axis of support and position the rotor means to rotate in a horizontal plane and in planes inclining forwardly or rearwardly of the horizontal, and means, including a drive shaft constituting a part of the means to connect the rotor supporting means to the fuselage to have adjustment about a horizontal axis, to operatively connect the rotor means to a prime mover or power means carried by the fuselage.

It is another object of the invention to provide in aircraft of this type a pair of rotors and improved means for supporting the rotors in axially spaced relation and to have independent rotation about concentric axes and connect the rotors to the fuselage to have adjustment about a horizontal axis coincident with the transverse axis of the fuselage, together with means to adjust the rotors to rotate in horizontal planes and in planes inclining forwardly or rearwardly relative to the horizontal, and means, including a drive shaft constituting a part of the means to connect the rotor means to the fuselage to have adjustment on a horizontal axis, to operatively connect the rotors to a prime mover carried by the fuselage and rotate the rotors in opposite directions.

A further object of the invention is to provide in aircraft of this type wherein the rotor means is connected to the fuselage to have adjustment on a horizontal axis and rotate on a vertical axis, means mounted below the rotor means in line with the downward flow of the air from the rotor means adapted to function to counteract torque of the rotor means acting to impart circular movement to the aircraft, and may also function to control the direction of flight of the aircraft.

Another object of the invention is to provide in aircraft of this type improved rotor means comprising a hub and propeller blades extending radially from said hub, and said propeller blades being constructed with the leading and trailing edges of each blade diverging outwardly from the hub and merging with a portion curved rearwardly and terminating in a rounded tip, and said propeller blades being of convexo-concave form in cross section with the leading edge rounded and the surfaces tapering from said leading edge to said trailing edge of the blades and the end portion of the blade curved downwardly.

A still further object of the invention is to provide in aircraft of this character, improved rotor means comprising a propeller including a hub having arms extending radially therefrom with the blades fixed to and extending radially from certain of the hub arms, and blades adjustably connected to one or more of said hub arms to extend radially outward from said hub arms and adapted to be positioned to extend at a right angle to the hub arms and to position to extend parallelly of a fixed blade.

Another object of the invention is the provision in aircraft of this type of means to moor the same to the ground and hold the rotor means against rotation.

Other objects and advantages of the invention will hereinafter appear.

In the drawings accompanying and forming a part of this application there is illustrated an embodiment of the invention, wherein Figure 1 is a side elevation of a helicopter having the forward end and the rearward end arranged with the usual horizontal stabilizing means and rudder broken away, and the intermediate portion of the wall broken away to show mechanism mounted in the fuselage.

Figure 2 is a front elevation, partly in section, the section being taken on the line 2—2 of Figure 1.

Figure 3 is a side elevation, partly broken away and partly in section, of means to adjust the fins to retain the same in vertical position and in position to incline forwardly and rearwardly relative to the vertical.

Figure 4 is a detail view taken on the line 4—4 of Figure 3 to show the mounting of the fins and the mounting and connection of the adjusting means to the fins.

Figure 5 is a side elevation, partly in section, of means connected to and for adjusting the fins and the means to actuate said adjusting means.

Figure 6 is a sectional view taken on the line 6—6 of Figure 5.

Figure 7 is a view taken on the line 7—7 of Figure 5 and looking at the rear of the means to actuate the fin adjusting means.

Figure 8 is a sectional detail view, on an enlarged scale, taken on the line 8—8 of Figure 7 to show the connection between the sections of a compound lever means for actuating the fin adjusting means.

Figure 9 is a sectional detail view, on an enlarged scale, taken on the line 9—9 of Figure 7.

Figure 10 is a perspective view showing in a diagrammatic manner the connection of the adjusting means to the fins to adjust the one fin to incline in one direction and the other fin to incline in the opposite direction relative to the vertical and the actuating means therefor.

Figure 11 is a plan view of a propeller of the rotor means and showing my improved arrangement of propeller blades, the blades being shown in full lines in normal position, and a pair of blades shown in dot and dash lines in a position of adjustment of said blades.

Figure 1:
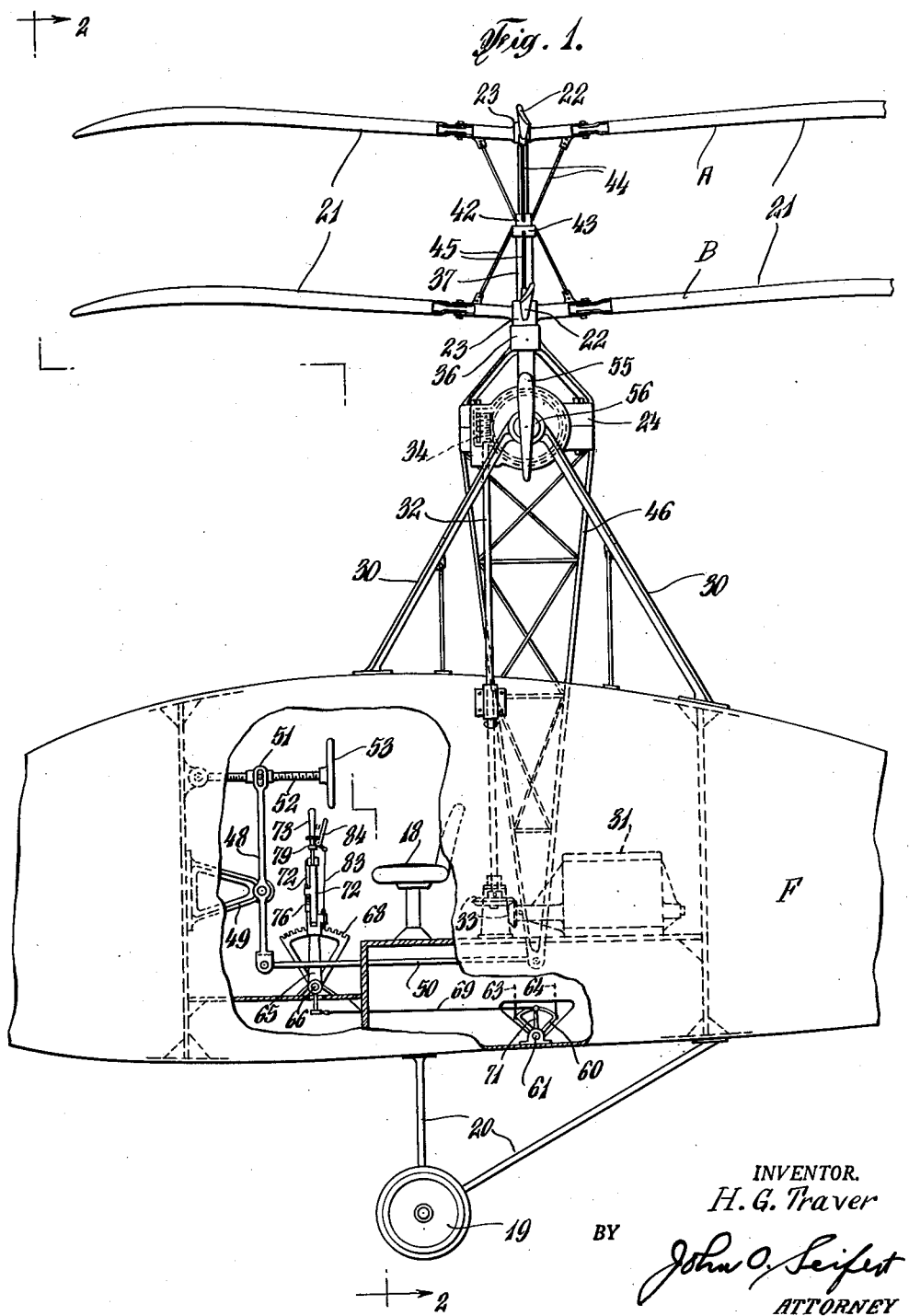

Figures 12 and 13 are transverse sectional views of a blade of the propeller taken on the lines 12—12 and 13—13, respectively, of Figure 11.

Figure 14 is a sectional detail view, on an enlarged scale, taken on the line 14—14 of Figure 11, to show the adjustable connection of a propeller blade to the propeller hub.

Figure 15 is a detail view in plan and on an enlarged scale of a portion of an arm of the propeller hub and of a portion of a propeller blade to show the adjustable connecting means and showing the propeller blade adjusted to position to extend radially from an arm of the propeller hub.

Figure 16 is a view showing in a diagrammatic manner the means connecting the blades of the axially spaced propellers of the rotor means to hold the same against rotation and to moor the rotor means to the fuselage; and Figure 17 is a view similar to Figure 16 but showing means to connect the blades of axially supported propellers of the rotor means to hold the same against rotation and mooring the rotor means and aircraft to the ground.

In carrying out the embodiment of the invention illustrated in the drawings there is provided a fuselage F which may be of any conventional form arranged with a seat or seats, shown in a conventional manner at 18, and having an opening in the top relative thereto. The rear end of the fuselage is provided with the usual tail assembly (not shown) consisting of horizontal stabilizing means, which may also function as an elevator, and a vertical rudder for controlling the direction of flight. The fuselage is also provided with a landing gear which may consist of a pair of wheels carried by brackets 20 fixed to the fuselage to dispose the wheels forwardly of the transverse center or axis of the fuselage, and a wheel or skid (not shown) may be provided to support the rear end of the aircraft on the ground.

Rotor means to lift or elevate and propel the aircraft is provided, and as shown comprises a pair of rotors or propellers A and B, each rotor or propeller including two pairs of blades 21, 22 carried by arms extending diametrically opposite from a hub 23 and spaced 90 degrees from each other, and the propellers supported in axially spaced relation to rotate about concentric axes.

Means are provided to support the rotor means from the fuselage and suspend the fuselage from the rotor means, and to support the rotor means to rotate about a vertical axis disposed in line or coincident with the transverse axis or center of the fuselage to effect adjustment of the rotor means to position to rotate in a horizontal plane and effect lifting and descending movements of the helicopter, or to rotate in planes inclining forwardly or rearwardly relative to the horizontal to sustain and propel the helicopter in a forward or rearward direction.

For this purpose there is provided a bearing box 24, which may consist of a pair of separable sections, having axially alined bosses or trunnions extended from the opposite ends and whereby the bearing box is rotatably supported on a pair of shafts 25, 26 mounted in a pair of coaxially spaced horizontal bearing members 27, 28 disposed in line with the transverse axis or center of the fuselage and mounted upon portions 29, 30 of a supporting frame fixed to and diverging upwardly from opposite sides of the longitudinal center of the fuselage. The shaft 26 is rotatable and constitutes a drive shaft for the rotor means and is operatively connected to and driven from the power shaft of a prime mover or power means, such as an internal combustion engine, shown in a conventional manner at 31, by a vertical shaft 32 geared, as at 33, to the shaft of the prime mover. The shaft 32 intersects and is operatively connected to the drive shaft 26 by a worm fixed on said shaft 32 meshing with a worm wheel fixed on the shaft 26, as shown at 34. The bearing box 24 is arranged with axially alined bearings or trunnions 35 extending at a right angle to the supporting trunnions and disposed in vertical alinement with the center of gravity of the helicopter, the one section of the bearing box being arranged with upwardly converging arms merging with a bearing member, as shown at 36, in axially spaced alinement with the trunnions 35.

The propellers or rotors A, B are connected to and rotatably supported by the bearing box 24 to rotate about concentric axes by a hollow shaft 37 extended through and rotatable in the upper trunnion 35 of the bearing box and the bearing member 36, and on which shaft the hub 23 carrying the blades of the propeller B is fixed and the bearing member 36 supported upon said shaft with an interposed anti-friction bearing, the shaft 37 extending upwardly above said propeller hub and into the bearing box and is operatively connected at said latter end to the drive shaft 26 by a bevel pinion 38 fixed on said drive shaft meshing with a bevel gear 39 fixed on the hollow shaft 37 within and connecting the bearing box to said hollow shaft. The propeller A is carried at the upper end of a shaft 40 extended through and having a bearing in the hollow shaft and in the lower bearing trunnion 35 of the bearing box and is operatively connected to the drive shaft 26 by a bevel gear 41 fixed thereto meshing with the pinion 38 on the drive shaft and also serving to connect the bearing box to the propeller carrying shafts. The shaft 40 is supported by a collar 42 fixed to the shaft engaging a collar 43 engaging the end of the hollow shaft, anti-friction bearings being interposed between the collars 42, 43 and the collar 43 and end of the hollow shaft. To provide additional supporting means for the rotors or propellers the propeller A is supported by the collar 42 by braces in the form of rods 44 connected at one end to said collar and at the opposite end to the blades of said propeller, or hub arms carrying said blades, and the propeller B is similarly supported from the collar 43 by braces in the form of rods 45 connected at one end to the collar 43 and connected at the opposite end to the blades of said propeller or the hub arms carrying said blades.

To cause the rotors or propellers to rotate in horizontal planes to lift or elevate and permit of descending movement of the helicopter, or to rotate in planes inclining forwardly or rearwardly relative to the horizontal to sustain and cause the helicopter to travel forwardly or rearwardly, means are provided to adjust the bearing box 24 and therewith the propeller supporting means about its horizontal axis of support. As shown this means comprises a tapering frame built of structural steel 46 secured at the base, by welding or otherwise, to the bottom section of the bearing box 24, as at 47, with the tapering end extending downwardly through an opening in the top of the fuselage, as shown in Figures 1 and 2. The lower end of said frame is connected to actuating means therefor, shown as a lever 48, pivotally supported by a bracket 49, fixed on an upright member of the framework of the fuselage, one arm of which lever is pivotally connected to one end of a connecting link or rod 50 pivotally connected at the opposite end to said frame 46. The opposite end of the lever 48 has a pin and slot connection with a sleeve, as shown at 51, threaded onto a threaded post 52 pivotally supported at one end on the upright of the framework of the fuselage to which the bracket 49 is fixed, and the opposite end having a hand wheel 53 fixed thereon and disposed adjacent the seat 18.

Means are provided to counteract torque of the rotor means, particularly when the rotor means consists of a single propeller, tending to cause the helicopter to deviate from a straight course in flight and impart circular movement thereto, which means may also function to control the direction of flight and effect turning movement of the helicopter. This means is disposed between the rotor means and fuselage in line with the downward flow of air from the rotor means and may comprise a fin so inclined relative to the line of flight as to cause or retard circular movement of the helicopter, or may comprise a series of fins disposed below the rotors at opposite sides of the longitudinal center of the fuselage so inclined as to cause or retard circular movement of the helicopter, or may be pivotally supported and adjustable to change the angular positions of said fins. As shown, a pair of fins 54, 55 are pivotally supported at one end to extend outwardly from opposite sides of the portions 29, 30 of the supporting frame and have adjustment on horizontal axes coaxially of the axis of support of the rotor supporting and adjusting bearing box 24. One end of the fins extends in a straight plane and the fins are provided at said end and centrally of the fins with a tubular bearing member 56 adapted to be engaged upon the ends of shafts 57, 58 mounted in and projecting from the gearing members 27, 28. The shafts 56, 57 may be fixed in the bearing members 27, 28 and the fins rotatably mounted on the projecting ends thereof, or said shafts may be loosely mounted in said bearing members and the fins fixed upon the projecting ends of said shafts.

Means are provided to adjust the fins about their axes of support to position both of the fins to extend in their normal vertical position, or to adjust both fins to incline forwardly relative to the vertical in the direction of the angle of inclination of the rotors or propellers to propel the helicopter forwardly, or to adjust both fins to incline rearwardly relative to the vertical in the direction of the angle of inclination of the rotors to propel the helicopter rearwardly, or to adjust the fins to position with one fin inclining forwardly and the other fin inclining rearwardly relative to the vertical. For this purpose a sector 59 is pivotally mounted on each of the shafts 57, 58 interposed between the end of the bearing members 56 fixed to the fins and the bearing members 27, 28, as shown in Figure 4. A pair of sectors 60 are fixed in spaced relation on a shaft 61 rotatably supported in bracket 62 fixedly supported in the fuselage, the sectors 60 being disposed below and in line with the sectors 59 and the sectors 59 connected to the sectors 60 by a pair of cables 63, 64 attached at one end to pins fixed in the sectors 59 adjacent the ends thereof and attached at the opposite ends to pins adjacent the ends of the sectors 60, as shown in Figures 3 and 5. The sector carrying shaft 61 is connected by a rod 69 to a section 65 (Figures 5 and 7) of a sectional lever fixed on a horizontal shaft 66 extending transversely of the fuselage and rotatably supported in bearing members 67 fixedly supported in the fuselage, said section of the lever being interposed between one of the bearings 67 and a toothed sector 68 juxtaposed to the other bearing 67 is disposed concentrically of the movement of the lever section 65 with the shaft 66 extended through an opening in a boss of the toothed sector, and the sector fixedly mounted in the fuselage. The other end of the rod 69 is connected to a yoke member 70 pivotally connected to an arm 71 fixed on the shaft 61 carrying the sectors 60. The lever section 65 is actuated by the other lever section 72 having a hand grip 73 pivotally mounted on a pin fixed in and extending between the legs of a bifurcation at the upper end of the lever section 65, as shown in Figure 8, to have movement on an axis transverse to the axis of support of the lever section 65 and releasably retained in adjusted position by a pawl 75 mounted to have longitudinal sliding movement in a lug extended laterally from the lever section 72 engaging a tooth space of a toothed sector 76 constructed integral with one of the legs of the bifurcation 74 at the end of the lever section 65. The pawl is connected by a link 77 to one end of a lever 78 pivotally mounted on the lever section 72 and the lever connected to an actuator 79 vertically slidable in spaced lugs 80 extended laterally from the lever section 72, a spring coiled about said actuator and confined between the lower lug 80 and a collar fixed on the actuator, as shown at 81, urging the actuator to position to normally engage the pawl with a tooth space of the toothed sector 76. The lever section 65 is releasably retained in adjusted position by a pawl 82 slidably engaging a slideway in one of the bifurcated legs 74 engaging a tooth space of the toothed sector 68, as shown in Figures 5 and 7. The pawl 82 is connected by a link 83 to one arm of a bell crank operating lever 84 pivotally carried by the lever section 72 and normally urged in a direction to engage the pawl 82 with a tooth space of the sector 68 by a spring 85 interposed between the other arm of the lever 84 and the hand grip 73 of said lever section 72. With the lever members in the position shown in Figures 5 and 7 the fins are in the vertical position shown in Figures 1, 2 and 3. To adjust the fins to position to incline forwardly relative to the vertical the lever section 65 is actuated to the right from the position shown in Figure 5, and to adjust the fins to position to incline rearwardly relative to the vertical said lever section 65 is actuated to the left from the position shown in said Figure 5.

To simultaneously adjust the fins 54, 55 to vertical position, or to positions with one fin inclining forwardly and the other fin inclining rearwardly relative to the vertical, as diagrammatically shown in Figure 10, the lever section 72 is arranged with two arms 86, 87 extending oppositely from the lever in line with the pivotal connection of the lever sections. A pair of cables 88, 89 are attached at one end to a pin extending from opposite sides of the lever arm 87 adjacent the end thereof, and a pair of cables 90, 91 are attached at one end to pins extended from opposite sides of the lever arm 86 adjacent the end thereof. As shown in Figure 3 a pair of rollers 92, 93 are rotatably mounted on each sector 59 adjacent the ends thereof and a pair of rollers 94, 95 are rotatably mounted on ears of the sectors disposed at opposite sides of the hub of the sectors. A cable guiding roller 96 (Figure 3) is rotatably supported by an arm extending downwardly from the hub of said sectors. The cable 89 is guided from the connection thereof with the lever arm 87 over rollers to the guide roller 96 carried by the sector 59 associated with fin 55 and from said roller over the roller 94, and from said latter roller over roller 92 and attached at the end to a pin 97 fixed in and extending from the end of the fin 55. The cable 91 attached to the other lever arm 86 is also attached to said pin 97, said cable being guided from the lever arm 86 over rollers to roller 96 associated with the fin 55 and by the latter roller guided over the other roller 95 and thence passes around the other roller 93 and attached at the end to the pin 97. The other cable 88 attached to the lever arm 87 passes around and is guided by rollers to roller 96 associated with the fin 54 and is guided by said latter roller over one of the pairs of rollers 95, 93 and attached at the end to the pin 97 fixed in and extending from the end of the fin 54. The cable 90 is attached to the lever arm 86, passes around and is guided by rollers to the roller 96 associated with the fin 54 at the side opposite the cable 88 and thence passes over the other roller of the pairs of rollers 94 and 92 and attached to the pin 97 fixed in the fin 54. The passing of the cables 89, 91 over rollers 96, 94, 95 associated with the fin 55, and the cables 88, 91 passing around the corresponding rollers carried by the sector associated with the fin 54 and attached to the pin 97 fixed in said latter fin also function to operatively connect the sectors 59 to the respective fins 54, 55 when the sectors are actuated by the cables 63, 64 to adjust the fins to incline in the same direction forwardly or rearwardly relative to the vertical. Should the lever section 72 be actuated in the direction indicated by the arrow in Figure 10 move the lever arm 87 will be moved upwardly and the fins actuated in the direction indicated by the arrows a and b, the fin 54 being adjusted to position to incline rearwardly relative to the vertical and the fin 55 adjusted to incline forwardly relative to the vertical. Should the lever section 72 be actuated in a direction opposite to that indicated by the arrow in Figure 10 the fins 54, 55 will be adjusted in a direction opposite to that indicated by the arrows a, b, the fin 54 being adjusted to incline forwardly and the fin 55 to incline rearwardly relative to the vertical by the connection of the cables 89, 90 with the lever arms 86, 87 and the connection of cable 90 to the fin 54 and connection of cable 91 to fin 55. The lever section 72 and thereby the fins are releasably retained in adjusted position by the engagement of the pawl 75 carried by the lever section 72 with a tooth space of the toothed sector 76 associated with the lever section 65.

To increase the lifting effect of the rotors or propellers there is provided an improved construction and arrangement of propeller blades as shown in Figures 11 to 15. Each of the propellers consists of four propeller blades disposed in diametrically opposite pairs and spaced 90 degrees apart. The propeller hub 23 is arranged with the pairs of diametrically outward extending arms 99 in which the blades are mounted. The leading and trailing edges of the blades diverge outwardly from each other to substantially one-half the length of the blades, as at 100, and merge with rearwardly curved portions 101 extending toward and merging with a rounded portion at the tip, and whereby the end portion of the blades is curved rearwardly. The blades are of convexo-concave form in cross section, as shown in Figures 12 and 13, with the leading edge rounded and the blades tapering from the leading edge and the trailing edge.

The propeller blades are of a length to extend beyond the opposite sides of the fuselage, and to adapt the helicopter to be stored in a hangar of small size certain of the blades are adjustable to extend radially from the propeller hub or to position to extend parallelly of another blade longitudinally of the fuselage. As shown, a pair of diametrically opposite extending blades are adjustably connected to the hub arm 99 whereby said blades may be adjusted to extend radially from the hub arms or be adjusted to position to extend at substantially a right angle to the hub arms and in the direction of the other pair of propellers, as shown in dot and dash lines in Figure 11, and the propeller is adjusted to position with the blades extending in a direction longitudinally of the fuselage. For this purpose a pair of diametrically oppositely extending hub arms are arranged with a bifurcated end, as shown at 102 in Figure 14, and the end of a pair of propeller blades, such as the blades 21, are also bifurcated, as shown at 103, and arranged whereby one of the bifurcation legs of the blades will engage within and be juxtaposed to a bifurcation leg of a hub arm, and the other bifurcation leg of the blade engaging at the outer side and juxtaposed to the other leg of the bifurcation of the hub arm. The blades are pivotally connected to the hub arms by a headed pin engaging in alined openings in the interengaged bifurcated portions of the hub arms and blades, as at 104, and the pin having a collar fixed on the opposite end, or a nut threaded thereon. To hold the blades against movement when adjusted to position to extend radially outward from the hub arms a pin or bolt is engaged and secured in alined openings in the interengaged portions of the bifurcations, as at 105. To adjust the blades to extend at a right angle to the hub arms the pin or bolt 105 is removed and the blades adjusted on the pin or bolt 104 to position openings in the blades in register with openings 106 in the hub arms, and the pin or bolt 105 may be engaged therein to hold the blades in said position.

To moor the aircraft in the open, means are provided to secure the rotors or propellers A and B against rotation and secure the rotors or propellers to the fuselage, or to the ground and thus moor the aircraft. In Figure 16 the blades 21 of the propellers A and B are shown in a diagrammatic manner as secured together and held against rotation by rods or cables, as shown at 107, and the propellers anchored to the fuselage, shown in a conventional manner by dot and dash lines, by rods or cables 108. In the arrangement shown in Figure 17 the rotors or propellers are held against rotation in a manner similar to that shown in Figure 16 by rods or cables 107, and the propellers anchored or moored to a stake in a ground by cables 109, said cables also functioning to anchor or moor the aircraft to the ground.

Having described my invention, I claim:

1. In a helicopter including a fuselage arranged with horizontal stabilizing means and a vertical rudder and power means carried thereby, a supporting frame fixed to the fuselage intermediate the ends having lateral spaced portions diverging upwardly from opposite sides of the longitudinal center of the fuselage, a shaft carried at the upper end of each of said frame portions disposed in axially spaced horizontal relation in line with the transverse center of the fuselage and one of said shafts being rotatable and constituting a drive shaft, means to operatively connect and rotate said drive shaft from the power means, a bearing box pivotally mounted on and connected to the frame through said shafts and having a lever member fixed to and extending downwardly therefrom between the frame portions into the fuselage, a pair of elevating and propelling rotors, means rotatable in and connecting said rotors in superposed spaced relation to the bearing box to rotate on concentric vertical axes coincident with the center of gravity of the fuselage, means to operatively connect said rotors to the drive shaft of the means connecting the bearing box to the frame and rotate the same with the rotors in opposite directions, and means connected to the lever member extended downwardly from the bearing box including a lever pivotally mounted in the fuselage and operative to adjust the bearing box with the rotors on the shafts supporting and connecting the bearing box to the frame and position the rotors to rotate in a horizontal plane and in different planes inclining to the horizontal.

2. In a helicopter as claimed in claim 1, a pair of fins mounted on the supporting frame to extend outwardly from the opposite sides thereof and have adjustment on axes coaxially of the shafts supporting and connecting the bearing box to the frame, and means operative to simultaneously adjust said fins on their axes of support to extend in a vertical plane and to positions to incline at the same angle and direction in different planes relative to the vertical.

3. In a helicopter as claimed in claim 1, a pair of fins mounted on the supporting frame to extend outwardly from the opposite sides thereof and have adjustment on axes coaxially of the shafts supporting and connecting the bearing box to the frame, means operative to adjust said fins on their axes of support to extend in a vertical plane transversely of the line of flight and to positions to incline at the same angle and direction in different planes relative to the vertical, and means to adjust the fins to incline in opposite directions at the same angle relative to the vertical.

4. In a helicopter as claimed in claim 1, a pair of fins mounted on and extending outwardly from the upwardly diverging portions of the supporting frame to have adjustment on axes coaxially on the shafts supporting and connecting the bearing box to the frame, and means operative simultaneously to adjust said fins on their axes of support to extend in a vertical plane and adjust the fins to incline at the same angle and direction relative to the vertical and to incline in opposite directions at the same angle relative to the vertical.

5. In a helicopter including a fuselage and a prime mover carried thereby, a supporting frame mounted on the fuselage, a pair of lifting and propelling propellers, means supporting said propellers in axially spaced relation and to have independent rotation on coaxial axes connected to said supporting frame to have pivotal movement on a horizontal axis in line with the transverse center of the fuselage and dispose the propellers with the axes of rotation thereof in line with the center of gravity of the fuselage, means to operatively connect and rotate the propeller supporting means with the propellers in opposite directions from the prime mover, means to adjust said propeller supporting means with the propellers about its horizontal axis of support in the supporting frame to position the propellers to rotate in horizontal planes and in planes inclining forwardly or rearwardly of the fuselage relative to the horizontal, fins pivotally supported below the propellers to extend from opposite sides of the fuselage and have adjustment on horizontal axes, means connected to and operative to simultaneously adjust said fins to extend vertically and to positions to incline in the same direction relative to the vertical, and means to simultaneously adjust said fins to incline in directions opposite to each other relative to the vertical.

6. In a helicopter including a fuselage and a prime mover mounted therein, a supporting frame mounted on and extending upwardly from the fuselage, rotor means, means connected to the supporting frame to have pivotal movement on a horizontal axis in line with the transverse center of the fuselage and rotatably supporting the rotor means to rotate on an axis coincident with the center of gravity of the fuselage, means to operatively connect and rotate the rotor means from the prime mover, means to adjust said rotor supporting means about its horizontal axis of support to position the rotor means to revolve in a horizontal plane and in planes inclining forwardly or rearwardly of the fuselage relative to the horizontal, fins mounted on the supporting frame below the rotor means to extend outwardly from the opposite sides thereof and have adjustment on horizontal axes extending transversely of the fuselage, a sector associated with and pivotally supported concentric of each fin, means for connecting and transmitting movement of the sectors to the fins, lever mechanism pivotally supported in the fuselage, and means to connect said lever mechanism to the sectors and adapted by actuation of the lever mechanism to simultaneously actuate said sectors to adjust the fins to vertical position transversely of the line of flight and to positions to incline forwardly or rearwardly of the vertical and to positions with one fin inclining in one direction relative to the vertical and the other fin to incline relative to the vertical in a direction opposite to the direction of inclination of the first fin, and means to releasably lock the lever mechanism against movement and the fins in adjusted position.

7. In a helicopter including a fuselage and a prime mover mounted therein, a supporting frame mounted on and extending upwardly from the fuselage, rotor means, means connected to the supporting frame to have pivotal movement on a horizontal axis in line with the transverse center of the fuselage and rotatably supporting the rotor means to rotate on an axis coincident with the center of gravity of the fuselage, means to operatively connect and rotate the rotor means from the prime mover, means to adjust said rotor supporting means about its horizontal axis of support to position the rotor means to revolve in a horizontal plane and in planes inclining forwardly or rearwardly of the fuselage relative to the horizontal, fins mounted on the supporting frame below the rotor means to extend outwardly from the opposite sides thereof and have adjustment on horizontal axes extending transversely of the fuselage, means operative to simultaneously adjust the fins to extend vertically and to positions to incline in the same direction relative to the vertical comprising sectors associated with and loosely supported concentrically of the axis of support of the fins, means for connecting and transmitting movement of said sectors to the fins, sectors rotatably mounted on the fuselage below and in line with the first sectors, means connecting said sectors to transmit the movement of said second sectors to the first sectors, a pivoted lever connected to and operative to transmit pivotal movement to the second sectors, and means to releasably lock the lever against movement and thereby the sectors and fins in adjusted position.

8. In a helicopter as claimed in claim 7, means to adjust the fins to incline in directions opposite to each other relative to the vertical, comprises a pair of rollers mounted on each of the first sectors one adjacent each end thereof and a pair of rollers one at each side of the axis of support of the sectors, a pair of arms extending oppositely from the pivoted lever in line with the pivot support thereof, a pair of cables secured at one end to one arm of the lever, one of said cables passing over one roller of the pair of rollers carried by one sector and secured to the fin associated with said sector, and the other cable passing over a roller of the pair of rollers carried by the sector associated with the other fin and secured to said latter fin, a second pair of cables secured at one end to the other lever arm, one of said cables passing over the other roller of the pair of rollers carried by a sector associated with one fin and secured to said fin, and the other cable passing over the other roller of the pair of rollers carried by the sector associated with the other fin and secured to said fin.

HARRY G. TRAVER.

REFERENCES CITED

The following references are of record in the file of this patent:

UNITED STATES PATENTS

| Number | Name | Date |
|---|---|---|
| 1,189,680 | Gardner | July 4, 1916 |
| 1,236,741 | Morris | Aug. 14, 1917 |
| 1,345,159 | Freeman | June 29, 1920 |
| 1,356,534 | Lemire | Oct. 26, 1920 |
| 1,378,112 | Hewitt | May 17, 1921 |
| 1,672,276 | Nordberg | June 5, 1928 |
| 1,692,082 | Cierva | Nov. 20, 1928 |
| 1,775,783 | Perrin | Sept. 16, 1930 |
| 1,910,520 | Cierva | May 23, 1933 |
| 1,969,781 | Cierva | Aug. 14, 1934 |
| 1,977,724 | Hays | Oct. 23, 1934 |
| 2,037,745 | Vaughn | Apr. 21, 1936 |
| 2,058,678 | Fry | Oct. 17, 1936 |
| 2,074,805 | Platt | Mar. 23, 1937 |
| 2,302,068 | Stanley | Nov. 17, 1942 |
| 2,381,968 | Bossi | Aug. 14, 1945 |
| 2,404,014 | Thornes | July 16, 1946 |

FOREIGN PATENTS

| Number | Country | Date |
|---|---|---|
| 432,245 | Great Britain | July 18, 1935 |